(No Model.)

W. S. CANADAY.
PAN FOR BAKING CAKES, PUDDING, &c.

No. 465,425. Patented Dec. 15, 1891.

Witnesses.
A. Ruppert,
G. B. Towles.

Inventor.
Winfield S. Canaday,
Per
Thomas P. Simpson,
atty.

UNITED STATES PATENT OFFICE.

WINFIELD S. CANADAY, OF FLORENCE, ALABAMA.

PAN FOR BAKING CAKES, PUDDINGS, &c.

SPECIFICATION forming part of Letters Patent No. 465,425, dated December 15, 1891.

Application filed June 3, 1891. Serial No. 394,931. (No model.)

*To all whom it may concern:*

Be it known that I, WINFIELD S. CANADAY, a citizen of the United States, residing at Florence, in the county of Lauderdale and State of Alabama, have invented certain new and useful Improvements in Pans for Baking Cakes, Puddings, and Custards; and I do hereby declare the following to be a full, clear, and exact description of the invention, such as will enable others skilled in the art to which it appertains to make and use the same.

The special object of the invention is to suspend a baking-pan within an imperforate case, so that the hot air will circulate over, under, and around it, as hereinafter described.

Figure 1:
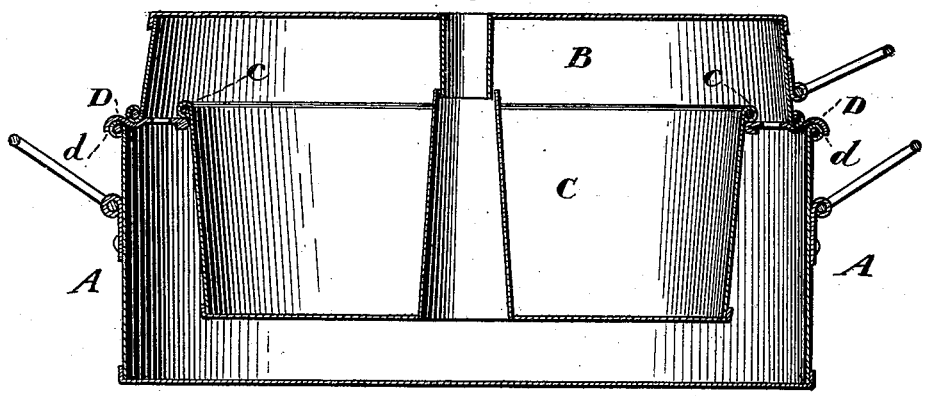
Figure 2:
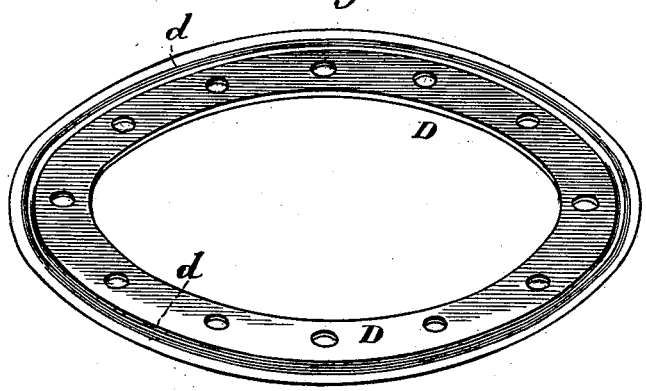
Figure 3:
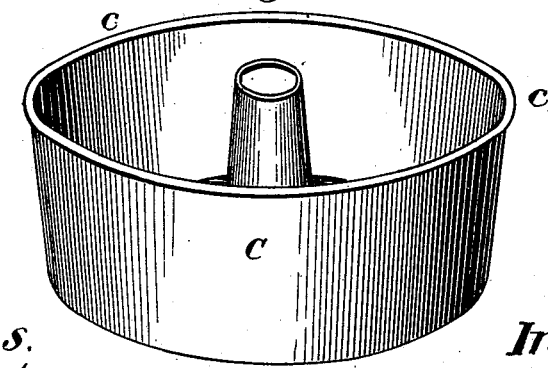

Figure 1 of the drawings is a diametrical section of the case, cake-holder, and annular band; Fig. 2, a detail perspective view of the perforated band, and Fig. 3 a similar view of the cake-pan.

In the drawings, A represents the imperforate case; B, the cover with the central outlet-tube for vapor or hot air; C, the cake-holder, and D the perforated band. The latter has at its outer edge a subjacent groove $d$, which fits over the upper edge of the case A, while the cake-holder C has a bead $c$, which rests upon the inner edge of the perforated band D. I allow a quarter to a half inch of space between the side of the case and that of the cake-holder, while there is an open space of about one-half of an inch under the cake-pan and an open space in the cover B. It will thus be seen that the cake-pan is suspended in a hot-air chamber, so that the same temperature, or very nearly so, will pervade the air all round the cake-pan. This will cause the cake or pudding or custard to be uniformly cooked on top, bottom, and at the sides.

Having thus described all that is necessary to a full understanding of my invention, what I claim as new, and desire to protect by Letters Patent, is—

A cake-pan consisting of the imperforate case A, cover B, having escape-tube $b$, cake-holder C, having the bead $c$ and an imperforate bottom, and the perforated band D, the four parts A B C D adapted to be used together, as described.

In testimony whereof I have affixed my signature in presence of two witnesses.

WINFIELD S. CANADAY.

Witnesses:
  GOODWIN H. WILLIAMS,
  A. G. NEGLEY.